US010831773B2

(12) United States Patent
Schoueri et al.

(10) Patent No.: US 10,831,773 B2
(45) Date of Patent: Nov. 10, 2020

(54) METHOD AND SYSTEM FOR PARALLELIZATION OF INGESTION OF LARGE DATA SETS

(71) Applicant: Next Pathway Inc., Toronto (CA)

(72) Inventors: Badih Schoueri, Mississauga (CA); Gregory Gorshtein, Thornhill (CA); Vladimir Antonevich, Toronto (CA)

(73) Assignee: NEXT PATHWAY INC., Toronto (CA)

( * ) Notice: Subject to any disclaimer, the term of this patent is extended or adjusted under 35 U.S.C. 154(b) by 94 days.

(21) Appl. No.: 15/909,846

(22) Filed: Mar. 1, 2018

(65) Prior Publication Data

US 2018/0253478 A1 Sep. 6, 2018

Related U.S. Application Data

(60) Provisional application No. 62/465,426, filed on Mar. 1, 2017.

(51) Int. Cl.
| | |
|---|---|
| *G06F 3/06* | (2006.01) |
| *G06F 16/10* | (2019.01) |
| *G06F 16/25* | (2019.01) |
| *G06F 16/84* | (2019.01) |

(52) U.S. Cl.
CPC .......... *G06F 16/254* (2019.01); *G06F 3/0643* (2013.01); *G06F 16/10* (2019.01); *G06F 16/84* (2019.01)

(58) Field of Classification Search
CPC ........ G06F 16/254; G06F 16/10; G06F 16/84; G06F 3/0643
See application file for complete search history.

(56) References Cited

U.S. PATENT DOCUMENTS

| | | | |
|---|---|---|---|
| 6,622,187 B1* | 9/2003 | Brune | H04L 12/40117 710/100 |
| 8,266,148 B2 | 9/2012 | Guha et al. | |
| 9,324,022 B2 | 4/2016 | Williams, Jr. et al. | |
| 9,324,033 B2 | 4/2016 | Boldyrev et al. | |
| 10,013,656 B1* | 7/2018 | Ciarlini | G06F 9/453 |
| 10,656,861 B1* | 5/2020 | Florissi | G06F 3/0604 |
| 2012/0297145 A1* | 11/2012 | Castillo | G06F 12/0868 711/138 |
| 2015/0312335 A1* | 10/2015 | Ying | H04L 67/1061 709/201 |
| 2015/0356094 A1* | 12/2015 | Gorelik | G06F 16/16 707/748 |

(Continued)

*Primary Examiner* — Jorge A Casanova
(74) *Attorney, Agent, or Firm* — Lewis Roca Rothgerber Christie LLP

(57) ABSTRACT

Embodiments of the present invention relate to systems and methods for ingesting input data containing a plurality of records into a data lake. In an embodiment, the method comprises splitting the input data into a plurality of input splits consisting of a balanced number of records; reading the records from the plurality of input splits in parallel, regardless of the format and encoding of the input source; converting the input data within the records into at least one key/value pair; transforming the values input data into a serializable format; sorting the key/value pairs of the transformed values such that the records are sorted in the same order as they were read; writing the transformed values to an output file; and storing the output file to the data lake.

11 Claims, 3 Drawing Sheets

(56) References Cited

U.S. PATENT DOCUMENTS

| | | |
|---|---|---|
| 2016/0092557 A1 | 3/2016 | Stojanovic et al. |
| 2017/0006135 A1 | 1/2017 | Siebel et al. |
| 2017/0109418 A1 | 4/2017 | Bartlett et al. |
| 2018/0095952 A1* | 4/2018 | Rehal .................... G06F 16/907 |
| 2019/0266496 A1* | 8/2019 | Florissi ................ G06Q 20/065 |
| 2019/0317949 A1* | 10/2019 | Florissi .................. G06F 16/27 |

* cited by examiner

METHOD AND SYSTEM FOR PARALLELIZATION OF INGESTION OF LARGE DATA SETS

CROSS REFERENCE TO RELATED APPLICATION

This Patent Application claims priority to and the benefit of U.S. Provisional Patent Application Ser. No. 62/465,426, filed on Mar. 1, 2017, the entire content of which is hereby expressly incorporated by reference

FIELD OF THE INVENTION

The present invention relates generally to large-scale data management and, more particularly to the ingestion, processing and storage of large-scale data.

BACKGROUND OF THE INVENTION

Big data is a term for data sets that are so large or complex that traditional data processing applications are inadequate to deal with them. Data sets have grown rapidly—in part because they are increasingly gathered by cheap and numerous information-sensing devices and networks. The world's technological capacity to store information has also necessarily increased phenomenally. A data lake is a storage repository that holds vast amounts of raw data.

Ingestion of data remains a challenge for many organizations trying to get necessary data in and out of various dependent systems. The challenge becomes even more unique when looking to ingest data in and out of Hadoop™ (an open-source software framework used for distributed storage and processing of big data sets), as Hadoop™ and associated technologies are relatively new technology ecosystems and as such, the maturity of the toolsets around these ecosystems is still relatively low. In particular, data ingestion and standardization into a Hadoop™ based Enterprise Data Lake (EDL) is a challenge for most organizations.

The current approaches to data ingestion are to write Extract/Transform/Load (ETL) scripts, where a human resource needs to manually map source and target, field by field, using a user interface driven tool. The tool will then generate code that implements the full Software Development Life Cycle (SDLC) that any developed application has to go through. Thus, every time data from a new source (e.g., a database table) needs to be ingested into the data lake, the SDLC must be followed, and manual intervention is required to perform the mappings.

One option to identify and eliminate bottlenecks is to optimize the performance of the existing code. Transformation of existing code uses a sequential single-threaded read, transformation of the data, and a write of the results to an output file. In the case of small common business-oriented language (COBOL) files for example, it was found that most central processing unit (CPU) cycles are spent within third-party libraries for reading COBOL files. Switching to another library is often not possible since the number of available libraries in that specific case is very small. Thus, optimizing transformation code would yield marginal improvements since the main bottleneck of reading COBOL files cannot be changed.

Multithreaded execution, whereby a software program can execute tasks concurrently within a process, can speed up processing by leveraging parallel execution on multiple CPU cores. This would improve the problem of inefficient code. However, this approach does not help with large datasets, as individual datasets are still processed sequentially.

Another option is to run multiple transformation jobs simultaneously. This approach does not decrease a single job execution time but instead increases overall throughput. However, the bottlenecks here are the same as with multi-threaded execution: intensive CPU load and processing node becomes both CPU and input/output (TO) bound.

Therefore, there is a need not only for ingesting and processing datasets concurrently, but also to ingest and process each individual dataset in a parallel manner to provide an upper bound for the time required to process even large datasets. There is also a need to be able to split any file into blocks without having to parse the content of the entire file sequentially first, otherwise performance would still be IO bound on read.

SUMMARY OF THE INVENTION

An object of the present invention is to overcome the deficiencies in the prior art associated with the ingestion, processing and storage of large-scale data. Further objects of the present invention will be apparent to persons skilled in the art reading the following summary of the invention, brief description of the drawings and detailed description of the embodiments.

In accordance with an aspect of the present invention, there is provided a method for ingesting, in parallel, input data containing a plurality of records into a data lake, the method comprising: splitting the input data into a plurality of input splits, the input splits consisting of a balanced number of records; reading records from the plurality of input splits in parallel across the splits; converting the input data within the records into at least one key/value pair; transforming the input data into a serializable format; sorting the key/value pairs of the transformed values such that the records are sorted in the same order as they were read; writing the transformed values to an output file, in the same order as the records were read; and storing the output file to the data lake.

In an embodiment of the present invention, the records are read from the plurality of input splits in parallel across the splits, regardless of the format and encoding of the input source.

In an embodiment of the present invention, the input data is in a format selected from the group consisting of American Standard Code for Information Interchange encoding, COBOL in Extended Binary Coded Decimal Interchange Code encoding, fixed length files, Extensible Markup Language, and JavaScript Object Notation.

In an embodiment of the present invention, the input data is split to keep the records as a whole.

In an embodiment of the present invention, during the sorting step, values having the same key are grouped together.

In accordance with another aspect of the present invention, there is provided a system for ingesting, in parallel, input data containing a plurality of records into a data lake, the system comprising: one or more processors adapted to execute one or more modules, the modules comprising: an input module for splitting the input data into input splits; a mapping module for transforming, in parallel, the input data in the input splits into a format for processing; a partition module for sorting the transformed data; and an output module for writing the sorted transformed data to an output file and determining a location on the data lake for the output file; and a driver for communicating with the one or more modules of the one or more processors via a first communication layer, the driver configuring the one or more modules and calculating the input splits.

In an embodiment of the present invention, the system further comprises a distributed cache in communication with the one or more modules via a second communication layer, the distributed cache enabling temporary sharing of computing resources and storage.

In an embodiment of the present invention, the input data is split to keep records as a whole.

In an embodiment of the present invention, the input data is transformed into key/value pairs.

In an embodiment of the present invention, the partition module sorts the key/value pairs such that values having the same key are grouped together.

In an embodiment of the present invention, key/value pairs are sorted in the same order as they were read.

In an embodiment of the present invention, the output module writes the sorted transformed values in the same order as the records were read.

BRIEF DESCRIPTION OF THE DRAWINGS

An embodiment will now be described, by way of example only, with reference to the attached Figures, wherein.

DETAILED DESCRIPTION OF THE EMBODIMENTS OF THE INVENTION

Figure 1:
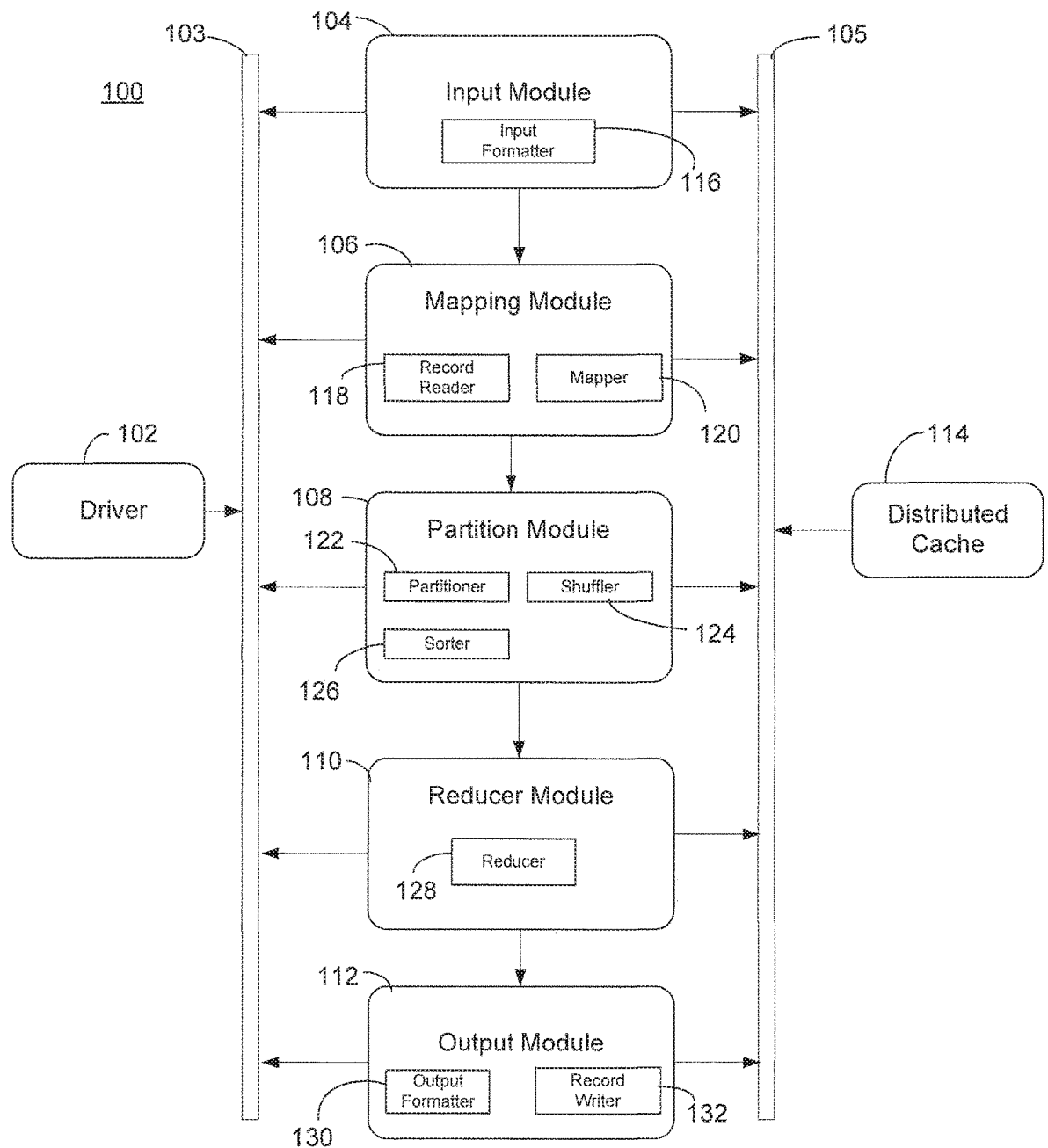
FIG. 1 shows a high-level architecture of a system for data ingestion.

Turning to FIG. 1, a high-level system is shown for ingesting datasets into a data lake and is generally referenced by the numeral 100. Datasets are ingested from specified sources (sources are specified and uniquely identified in the metadata) and can be in any format (e.g., comma separated values in American Standard Code for Information Interchange (ASCII) encoding, COBOL in Extended Binary Coded Decimal Interchange Code (EBCDIC) encoding, Fixed Length files, Extensible Markup Language (XML), JavaScript Object Notation (JSON)). The system 100 transforms the datasets into standard formats for the target system (e.g., Unicode Transformation Format (UTF8) encoding and Avro™ (a remote procedure call and data serialization framework), Optimized Row Columnar (ORC) or Parquet™ (a columnar storage format) on Hadoop™)

Figure 2:
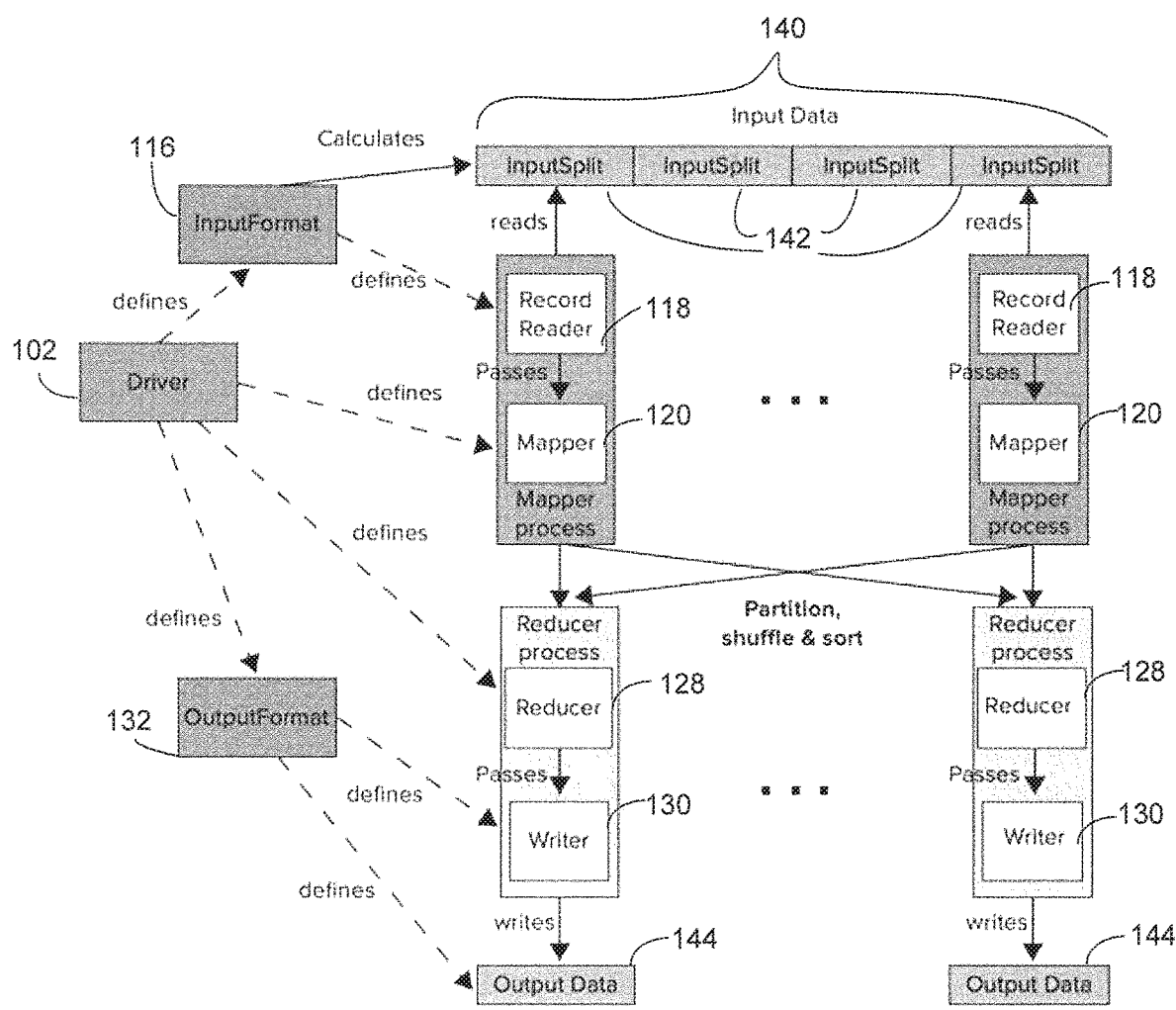
FIG. 2 shows an interaction diagram of the system of FIG. 1.

FIG. 2 shows the interaction of the modules of the system 100 during processing. The source format and encoding, as well as the target format and encoding are specified in the dataset's metadata. The system 100 will use this metadata to load the appropriate modules and drivers for both the source and targets (116, 118, 102, 130, 132) to perform the appropriate conversions and transformations.

The driver 102 initializes the job by defining the job specification, job configuration, and the configuration of all the system components. The driver 102 may also retrieve the status of the job execution.

The driver 102 communicates with communication layer 103 to communicate with the modules of the system 100: the input module 104, mapping module 106, partition module 108, reducer module 110, and output module 112.

The input module 104 may have an input formatter 116, which defines how the input data 140 is read and split. Input formatter 116 creates a plurality of input splits 142, each defining a chunk of input data 140 to process. The input splits 142 are calculated by the driver 102.

The mapping module 106 may have a record reader 118 and a mapper 120. The record reader 118 reads data from the source then converts the data into a format suitable for processing. An example of this conversion may be key/value pairs, where the record key would be a byte position in the file and its value would be the record itself.

The mapper 120 transforms the formatted data from the record reader 118 into the desired format for processing and outputs this transformation. In the example of key/value pairs, the mapper 120 transforms the input pair to an output pair. In the context of this embodiment, the mapper 120 maps the path of the source dataset block to the path of the transformed dataset block. The value of the key is the file path to the block on the file system.

The partition module 108 may have partitioner 122, shuffler 124, and a sorter 126. The partitioner 122 determines where to send a given key/value pair. The partitioner 122 determines a hash value for the key, where a hash value is a value of fixed length that uniquely identifies the value for the key in the key/value pair. The hash value is used to uniquely identify every block, while staying constant in length regardless of the size of the block. The shuffler 124 moves the output from the mapper 120 to the reducer module 110 based on the determination of the partitioner 122. The sorter 126 sorts the key/value pairs to group values having the same key before they are fed to the reducer module 110. Because unique keys are used, the converted records will be fed to the reducer module 110 in the same order as they were read by the record reader 118.

The reducer module 110 may have a reducer 128. The reducer 128 normally receives the key and an iterator over all the values associated with the key. The values associated with the key are returned by the iterator in an undefined order. In the case of data ingestion, the reducer 128 will simply pass the values from the partitioner 122 to the output module 112.

The output module 112 may have an output formatter 130 and a record writer 132. The output formatter 130 governs how the output file is written. The output formatter 130 defines a location of the output file 144 for storing the resulting transformed dataset. The record writer 132 defines how output records 144 are written. In the case of data ingestion, the output records 144 will either be a remote procedure call and data serialization framework such as an Avro™ recordset or an error file.

The input module 104, mapping module 106, partition module 108, reducer module 110, and output module 112 communicate with another communication layer 105 to communicate with the distributed cache 114. The distributed cache 114 can enable the sharing of data by all nodes on the cluster, where a cluster is a group of nodes, with each node comprising of both computing resources (CPU, memory) and storage. The distributed cache 114 can be a shared library to be accessed by each task or a lookup table holding the key/value pairs.

Figure 3:
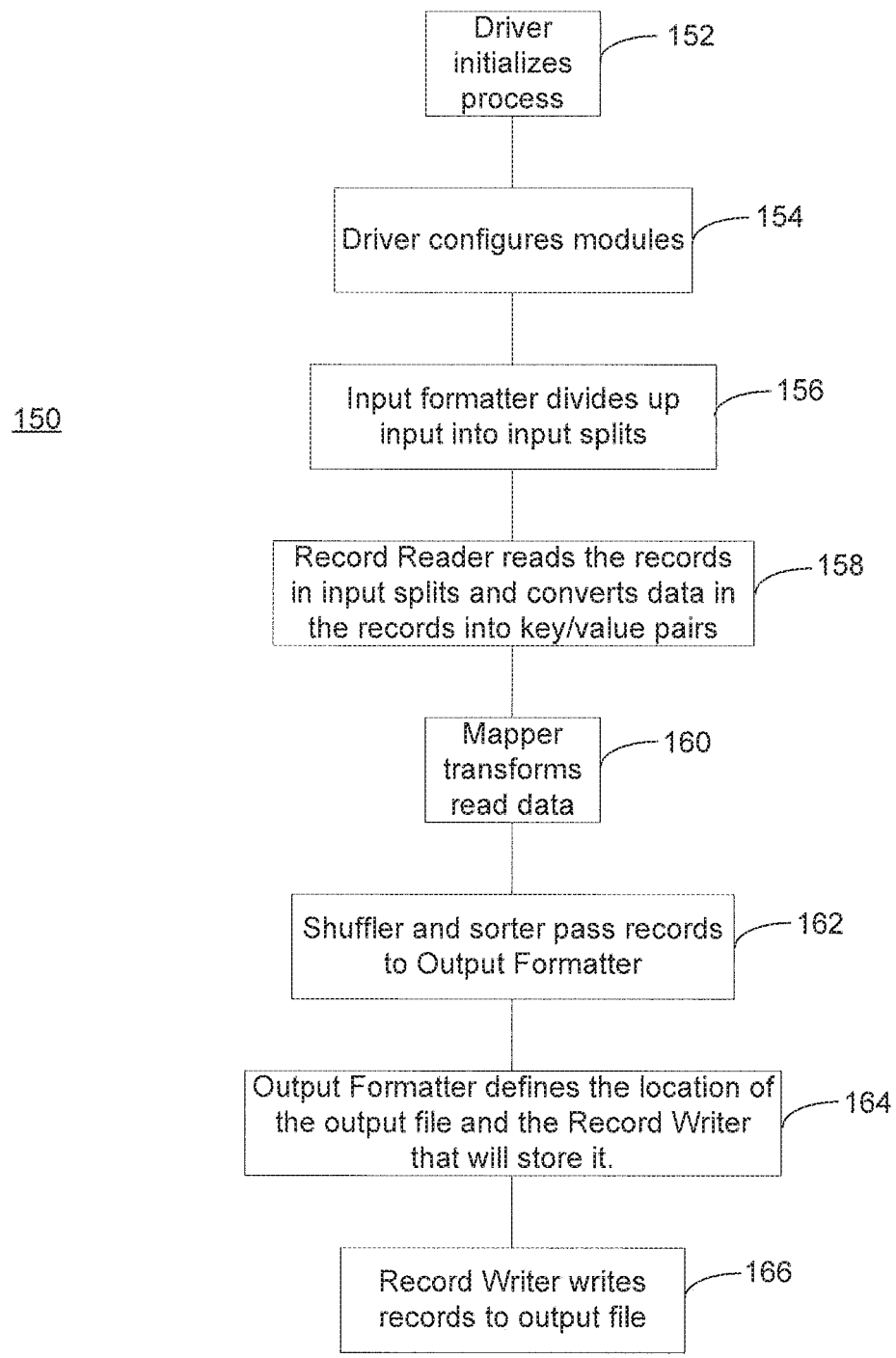
FIG. 3 shows a flow diagram of the method of ingestion.

FIG. 3 shows the workflow in the context of data ingestion and is generally referenced by the number 150. In step 152, the driver 102 initializes the process or job. In step 154, the driver 102 configures the input module 104, mapping module 106, partition module 108, reducer module 110, and output module 112.

The files ingested during workflow 150 may be have fixed length records where each record has exactly the same length, for example, COBOL fixed-length files. Files may also have variable-length records where each record is preceded with its byte length and records are grouped in blocks where each block also has leading byte length descriptor. Files may have a record terminator where the terminator can uniquely identify end of the record, for example, ASCII files with fixed-length fields terminated by \n terminator. Files may have a record terminator where record terminator may be encountered within the dataset, as for example, in CSV (comma separated values) data files.

In step 156, the input formatter 116 divides up the input data 140 into input splits 142. In one embodiment, the input formatter splits the input data 140 so that records are kept as a whole, (i.e., no input split 142 will contain partial records). Input data 140 may be split so that data locality is maximized (i.e., data that needs to be processed together is located together on the same storage system to minimize having to move data across nodes for processing) and there is minimum shuffling between nodes during the ingestion workflow. Input data 140 may be split so that the number of splits and the size of the splits minimize execution time of the ingestion workflow.

For files with records of a fixed length, splits are accomplished by specifying the split size when ingesting the file. The splitter will then split the file into equal blocks of records (the last block may be of smaller size), where each block can be processed independently and concurrently by a different mapper. This approach works for binary files too.

For files with records of variable length, the algorithm for splitting the file is more complicated. There are different types of variable length record files: Some, such as COBOL files, will indicate the record length at the beginning of each record. In this case the splitter will begin reading from the beginning of the file, and jump to the beginning of the next record based on the offset calculated from the current position in the file plus the length of the current record. This saves the IO of reading the entirety of each record. The splitter will then keep jumping to the beginning of the next record, until the calculated location in the file based on the offset exceeds the block size. The current location (prior to the last offset that caused the overrun beyond the block size) is the offset indicator for the end of the previous block. This algorithm continues until the end of the file is reached. As the file is processed in this manner, the splitter keeps track of all the offsets for block start and end, and will split the file into these blocks at the end of this process. Each block is then transformed in parallel by a different mapper, similarly to the fixed length file blocks.

Other variable length record files such as comma-separated values (CSV) files require a more complex approach to avoid scanning the entire file sequentially, as there is no indication of the size of each record. In this situation, the algorithm splits the file in equal blocks, and starts reading the file from the beginning of the block, as well as from the last character (the end of each block). The algorithm goes through the first record in the file until it finds the end-of-line (EOL) marker. It will keep that record in memory, and will proceed in transforming and persisting the subsequent records in the block. The algorithm also checks if the last character in the file is an EOL marker (and ensures it is not part of the data, i.e. an escaped character). If the record is complete (i.e., there was an EOL marker), then the record is kept in the file, otherwise a request is made to the node with the subsequent block number to send its first record (which was kept in memory). Blocks that do not receive a request to send their first record to another block can persist that record to their file as that indicates they have the full record.

In step 158, the record reader 118 reads the records in the input splits 142 and converts the data in the records into key/value pairs. In one embodiment, the record reader 118 reads the records one-by-one as provided by the input formatter 116.

In step 160, the mapper 120 transforms the read data to a desired file format. The file format may be GenericData™, which is serializable and the file name where these records have been serialized can be transferred over the network to the reducer step.

In step 162, the shuffler 124 moves the transformed files to a plurality of reducers 128 while the sorter sorts the key/value pairs for the given reducer 128 to group values having the same key before they are fed into the given reducer 128. Unique keys are used to guarantee the transformed records are written in the same order they are read. The reducer 128 will pass the records to the output formatter 130.

In step 164, the output formatter 130 defines the location of the output data 144 for the record writer 132 to store the resulting output file 144. In step 166, the record writer 132 writes records to the output file. In one embodiment, the record writer 132 may write GenericData™ to an Avro™ file or to Parquet™ file. Since records arrive sorted by the record key, the output file 144 (which contains these records) will be populated in the order records were read from input file 140 as well.

The above-described embodiments are intended to be examples of the present invention and alterations and modifications may be effected thereto, by those of skill in the art, without departing from the scope of the invention, which is defined solely by the claims appended hereto.

It should be understood that the phrase "a" or "an" used in conjunction with the Applicant's teachings with reference to various elements encompasses "one or more" or "at least one" unless the context clearly indicates otherwise. Additionally, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

While the Applicant's teachings have been particularly shown and described with reference to specific illustrative embodiments, it should be understood that various changes in form and detail may be made without departing from the scope of the teachings. Therefore, all embodiments that come within the scope of the teachings, and equivalents thereto, are claimed. The descriptions and diagrams of the methods of the Applicant's teachings should not be read as limited to the described order of elements unless stated to that effect.

While the Applicant's teachings have been described in conjunction with various embodiments and examples, it is not intended that the Applicant's teachings be limited to such embodiments or examples. On the contrary, the Applicant's teachings encompass various alternatives, modifications, and equivalents, as will be appreciated by those of skill in the art, and all such modifications or variations are believed to be within the scope of the invention.

What is claimed is:

1. A system for ingesting, in parallel, input data containing a plurality of records into a data lake, the system comprising:
   one or more processors adapted to execute one or more modules, the modules comprising:
      an input module for splitting the input data into input splits;
      a mapping module for reading and transforming, in parallel, the input data in the input splits into a format for processing;
      a partition module for sorting the transformed data; and
      an output module for writing the sorted transformed data to an output file and determining a location on the data lake for the output file; and
   a driver for communicating with the one or more modules of the one or more processors via a first communication layer, the driver configuring the one or more modules and calculating the input splits.

2. The system of claim 1, further comprising a distributed cache in communication with the one or more modules via a second communication layer, the distributed cache enabling temporary sharing of computing resources and storage.

3. The system of claim 1, wherein the input data is split to keep records as a whole.

4. The system of claim 1, wherein the input data is transformed into key/value pairs.

5. The system of claim 4, wherein the partition module sorts the key/value pairs such that values having the same key are grouped together.

6. The system of claim 5, wherein key/value pairs are sorted in the same order as they were read.

7. The system of claim 1, wherein the output module writes the sorted transformed values in the same order as the records were read.

8. A method for ingesting, in parallel, input data containing a plurality of records into a data lake, the method comprising:
   splitting the input data into a plurality of input splits, the input splits consisting of a balanced number of records;
   reading records from the plurality of input splits in parallel across the splits;
   converting the input data within the records into at least one key/value pair;
   transforming the input data into a serializable format;
   sorting the key/value pairs of the transformed values such that the records are sorted in the same order as they were read;
   writing the transformed values to an output file, in the same order as the records were read; and
   storing the output file to the data lake.

9. The method of claim 8, wherein the input data is in a format selected from the group consisting of American Standard Code for Information Interchange encoding, COBOL in Extended Binary Coded Decimal Interchange Code encoding, fixed length files, Extensible Markup Language, and JavaScript Object Notation.

10. The method of claim 8, wherein the input data is split to keep the records as a whole.

11. The method of claim 8, wherein during the sorting step, values having the same key are grouped together.

* * * * *